United States Patent
Way et al.

(10) Patent No.: US 6,214,078 B1
(45) Date of Patent: Apr. 10, 2001

(54) HIGH TEMPERATURE CERAMIC FILTER

(75) Inventors: Philip S. Way, Naples, NY (US); Thomas J. Vlach, Eastlake; Michael J. Bulley, Zanesville, both of OH (US)

(73) Assignee: Ferro Corporation, Cleveland, OH (US)

(*) Notice: Subject to any disclaimer, the term of this patent is extended or adjusted under 35 U.S.C. 154(b) by 0 days.

(21) Appl. No.: 09/273,990

(22) Filed: Mar. 22, 1999

Related U.S. Application Data

(63) Continuation-in-part of application No. 08/978,204, filed on Nov. 25, 1997, now abandoned.

(51) Int. Cl.$^7$ ............................................. B01D 39/20
(52) U.S. Cl. ............................. 55/523; 55/524; 428/446; 428/698
(58) Field of Search .................... 55/523, 527, 524; 428/403, 404, 698, 699, 702, 704, 446; 264/45.1, 122, 125, 682

(56) References Cited

U.S. PATENT DOCUMENTS

| | | |
|---|---|---|
| 3,353,982 * | 11/1967 | Blaha ............................. 55/523 |
| 3,966,391 | 6/1976 | Hindin et al. . |
| 4,021,185 | 5/1977 | Hindin et al. . |
| 4,069,295 | 1/1978 | Sugahara et al. . |
| 4,088,435 | 5/1978 | Hindin et al. . |
| 4,550,177 | 10/1985 | Kumar et al. . |
| 4,560,668 | 12/1985 | Hunold et al. . |
| 4,732,594 * | 3/1988 | Mizrah et al. ...................... 55/523 |
| 4,777,152 | 10/1988 | Tsukada . |
| 4,913,738 | 4/1990 | Tsukada . |
| 4,946,487 * | 8/1990 | Butkus ............................... 55/523 |
| 5,071,457 * | 12/1991 | Schmidt, Jr. et al. ............... 55/523 |
| 5,073,178 * | 12/1991 | Mimori et al. ...................... 55/523 |
| 5,093,289 | 3/1992 | Braetsch et al. . |
| 5,096,865 | 3/1992 | Dunworth . |
| 5,098,454 * | 3/1992 | Carpentier et al. ................ 55/523 |
| 5,100,035 | 3/1992 | Dunworth et al. . |
| 5,110,565 | 5/1992 | Weimer et al. . |
| 5,194,234 | 3/1993 | Weimer et al. . |
| 5,358,910 | 10/1994 | Atwell et al. . |
| 5,382,396 | 1/1995 | Lee et al. . |
| 5,527,442 | 6/1996 | Sekhar et al. . |
| 5,563,106 | 10/1996 | Binner et al . |
| 5,605,553 | 2/1997 | Connolly et al. . |
| 5,688,728 | 11/1997 | Niwa et al. . |
| 5,716,559 | 2/1998 | Larsen et al. . |
| 5,762,895 | 6/1998 | Schwetz et al. . |

FOREIGN PATENT DOCUMENTS

| | | |
|---|---|---|
| 4839515 | 6/1973 | (JP) . |

* cited by examiner

*Primary Examiner*—David A. Simmons
*Assistant Examiner*—Robert A. Hopkins
(74) *Attorney, Agent, or Firm*—Rankin, Hill, Porter & Clark LLP

(57) ABSTRACT

A porous refractory product suitable for use in filtering high temperature combustion products. The product includes a matrix of recrystallized silicon carbide formed by heating a cast preform containing relatively coarse silicon carbide crystals selected to produce the desired permeability, and relatively fine silicon carbide crystals to a temperature of at least 2320° C. At this temperature, the relatively fine silicon carbide crystals sublime and condense on the relatively large crystals. This results in recrystallization of the cast preform to form the porous matrix with the desired permeability.

7 Claims, 2 Drawing Sheets

HIGH TEMPERATURE CERAMIC FILTER

RELATED APPLICATIONS

This application is a continuation-in-part of application Ser. No. 08/978,204 filed Nov. 25, 1997 now abandoned and entitled the same.

FIELD OF THE INVENTION

This invention relates to permeable refractory products suitable for high temperature applications and especially to refractory products having a sufficient permeability and durability for use in high temperature gas filtration applications. More particularly, the invention relates to a permeable refractory structure in the form of a matrix of recrystallized silicon carbide. The invention has particular utility in connection with hot gas filtration in solid fuel fired gas turbines used for electrical power generation.

BACKGROUND OF THE INVENTION

Fossil fuels have had limited use as the energy source for turbines due to particulate matter that is produced in their combustion. This matter can cause the erosion and destruction of the turbine blades. At the high temperature required for efficient operation, often in excess of 900° C., deterioration of blades may be rapid resulting in down time and expensive repairs.

One method of overcoming this problem is to utilize heat exchangers where the combustion gases are passed through a system that utilizes a secondary flow path where "clean" air is separated by plates or tubes through which the heat is transferred. The clean air is then utilized to drive the turbine blades. The use of heat exchangers to drive turbines has been limited due to the lack of suitable materials and the inherent loss of efficiency in transferring heat.

A second approach to this problem has been to filter the combustion gas, removing the particulate matter. While some success has been achieved, only limited use has developed due to the lack of suitable materials to construct filter tubes that have sufficient permeability and high temperature strength.

Extensive work has been done in testing materials and designing hot gas filtration systems for this purpose. One material which has shown promise is clay-bonded silicon carbide which has good chemical resistance and good physical properties at elevated temperatures. However, this material has limits in that it loses strength at very high temperatures and oxidation produces a glass formation that decreases permeability and can seriously restrict filtration. High temperature creep also deforms and damages these filter tubes.

Recrystallized silicon carbide has been extensively used for kiln furniture and structural shapes in high temperature applications. This type of silicon carbide has much higher strength, both at room temperature and elevated temperature, than clay bonded silicon carbide. However, commercial recrystallized silicon carbide is produced with the highest density possible to provide the maximum achievable strength for its normal use as a structural refractory. This high density restricts both the pore size and the permeability of the material making it unsuitable for a gas filter.

The unique refractory product of the present invention, however, along with the method for making the product, resolves the problems indicated above and provides other features and advantages heretofore not obtainable.

SUMMARY OF THE INVENTION

It is an object of the invention to provide a porous refractory product suitable for use in filtering high temperature combustion products wherein the high temperature stream contains significant unwanted particulate matter. The refractory product comprises a matrix of recrystallized silicon carbide having a controlled porosity by volume of from between about 15% and about 40% and a pore size below about 250 $\mu$m, and preferably less than 200 $\mu$m.

In order to obtain the above objective, the inventors have combined the technology used in producing ceramic filters for a broad range of low temperature applications with the technology used for producing commercial, structural, recrystallized silicon carbide refractories. It must be appreciated that applicants' invention is formed of recrystallized silicon carbide, and is not a sintered silicon carbide product.

Ceramic filters can be produced by combining controlled sizes of ceramic grains with a glass former which, upon firing, forms a monolith with a controlled porosity. Both permeability and pore size can be closely controlled by controlling the size and range of the ceramic grains and the amount of glass former utilized.

In the manufacture of recrystallized silicon carbide, the particle size of the silicon carbide and the rheology of the casting slip are controlled to obtain the maximum density. This provides maximum strength but limits the permeability and the pore size obtained.

By utilizing closely controlled trimodal distribution of silicon carbide grain sizes, a casting can be produced in which the coarse grains form a matrix that produces a relatively open structure. During the firing process, the fine portion of the silicon carbide sublimes resulting in recrystallization with virtually no change in total net size. By altering furnace conditions, grain size packing and the fine portion, both the pore size and the permeability can be closely controlled. The method of the present invention also allows one to produce a one-piece monolithic filter structure. Thus, end pieces (caps) and collars are integrally formed—there is no need to separately produce these portions of the filter.

Filters with more restricted pore size can be produced by using the above cited technique to produce a substrate structure which is then coated with a thin layer of silicon carbide or other ceramic material which when re-fired forms a bonded membrane that can restrict pore size to 2 $\mu$m.

The foregoing and other features of the invention are hereinafter more fully described and particularly pointed out in the claims, and the following description setting forth in detail certain illustrative embodiments of the invention, these being indicative, however, of but a few of the various ways in which the principles of the present invention may be employed.

DESCRIPTION OF THE PREFERRED EMBODIMENT

Figure 1:
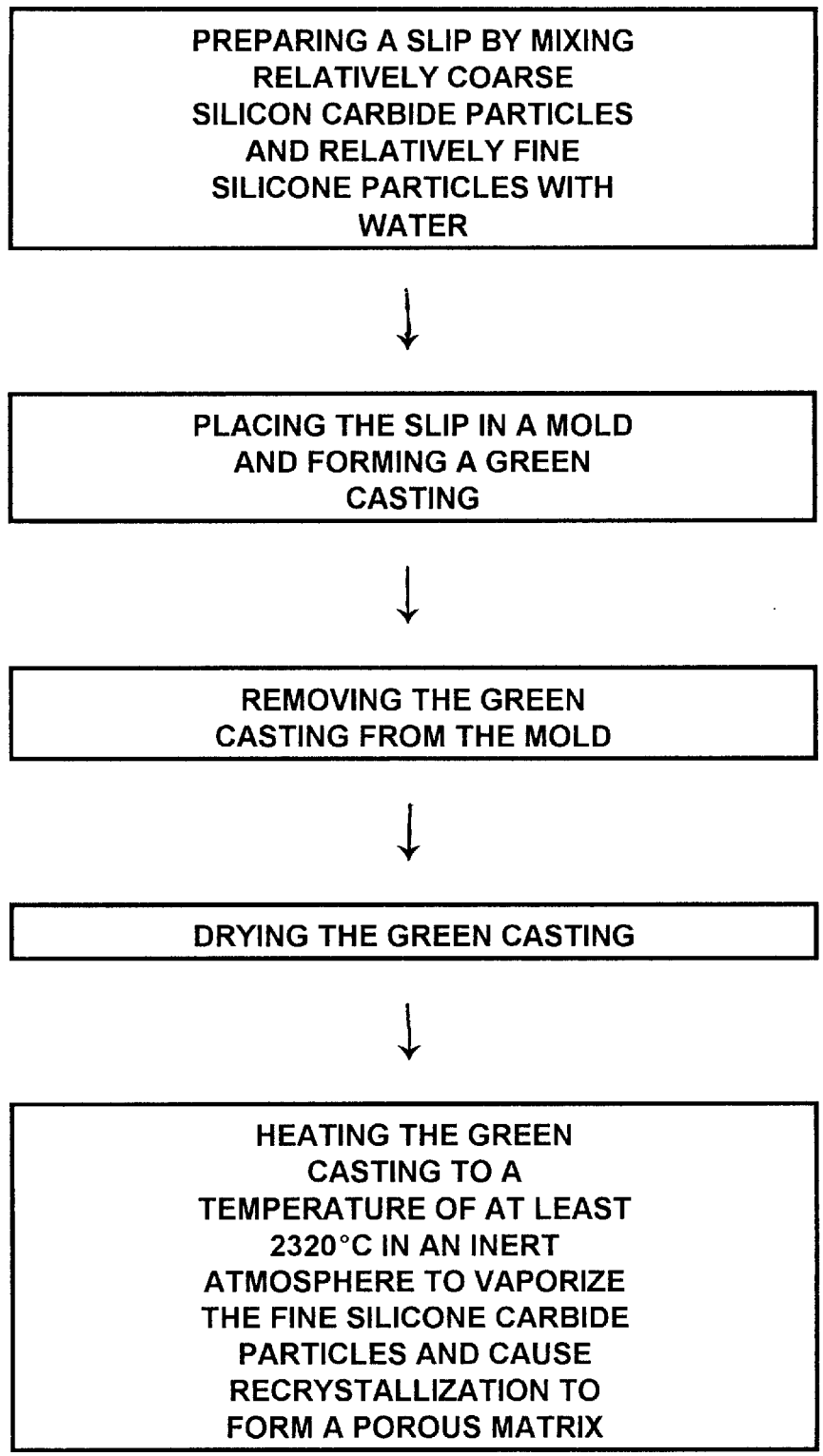
FIG. 1 is a block diagram showing the sequential steps of the process of the invention.

The method and product of the invention will be described with reference to FIG. 1 of the drawings which shows the sequential steps in abbreviated form. In a typical process of the invention, a batch or mixture is prepared to include a quantity of relatively coarse silicon carbide grains, a quantity of relatively fine silicon carbide grains and water. A deflocculant such as sodium silicate is generally provided as well. Other deflocculants may also be used such as ammonium hydroxide, triethylamine and other organo amines such as AMP 95 available from Angus Chemical. The batch is substantially free of silicon metal (i.e., no silicon metal is intentionally included in the batch). Thus, the batch consists essentially of silicon carbide.

The particle size for the coarse carbide grains is so selected as to provide the desired porosity in the product. The size of the fine particles is selected so as to assure sublimation and gaseous phase recrystallization of these particles at a temperature of at least about 2320° C. It is important to assure that the fine particles sublimate under conditions that do not cause sublimation of the relatively coarse silicon carbide particles so as to bond the large crystals into a monolithic single crystal structure. Applicants have found that the use of a trimodal particle size distribution of particles is critical. More particularly, preferably the silicon carbide particles utilized comprise from about 5% to about 20% by weight material having a grit size of from about 55 to about 65, from about 25% to about 50% by weight of a grit size of from about 40 to about 50, and from about 25% to about 55% by weight of an average particle size of from about 0.5 to about 25 $\mu$m. Grit sizes as referred to herein are as stated in (American Society For Engineers) ASE J4444 that defines grit sizes for abrasives. Under such standard, for example a 45 grit would exhibit 100% pass through 35 mesh (417 $\mu$m), 70% minimum at 42 mesh (351 $\mu$m) and 80% minimum at 48 mesh (295 $\mu$m). A 80 grit would exhibit 100% pass through at 65 mesh (208 $\mu$m), 70% minimum at 80 mesh (175 $\mu$m) and 80% minimum at 100 mesh (147 $\mu$m). Thus, the slip of the present invention comprises a mixture of relatively fine particles having an average particle size of less than 25 $\mu$m and relatively coarse particles having a particle size of from about 100 to about 400 $\mu$m.

The batch or mixture thus described must be thoroughly mixed. A ceramic lined ball mill with rubber balls has been found to be an effective method of obtaining complete wetting of the silicon carbide without agglomeration. The viscosity (rheology-control of dispersion/flocculation of particles) of the mixture may be stabilized by adjusting the water content and/or the deflocculant.

The prepared mixture is formed into shapes by pouring it into porous molds. Plaster has been found to be appropriate for these forming molds. As the water from the slip is drawn into the plaster mold, a solid layer of silicon carbide is built up. When the layer reaches the desired thickness, the remaining liquid is poured from the mold. This type of drain casting is familiar to those employed in the ceramic industry.

When the formed shape has become firm, it can be removed from the mold and further dried in an oven to insure the removal of any remaining water. The shape is then ready for firing.

Figure 2:
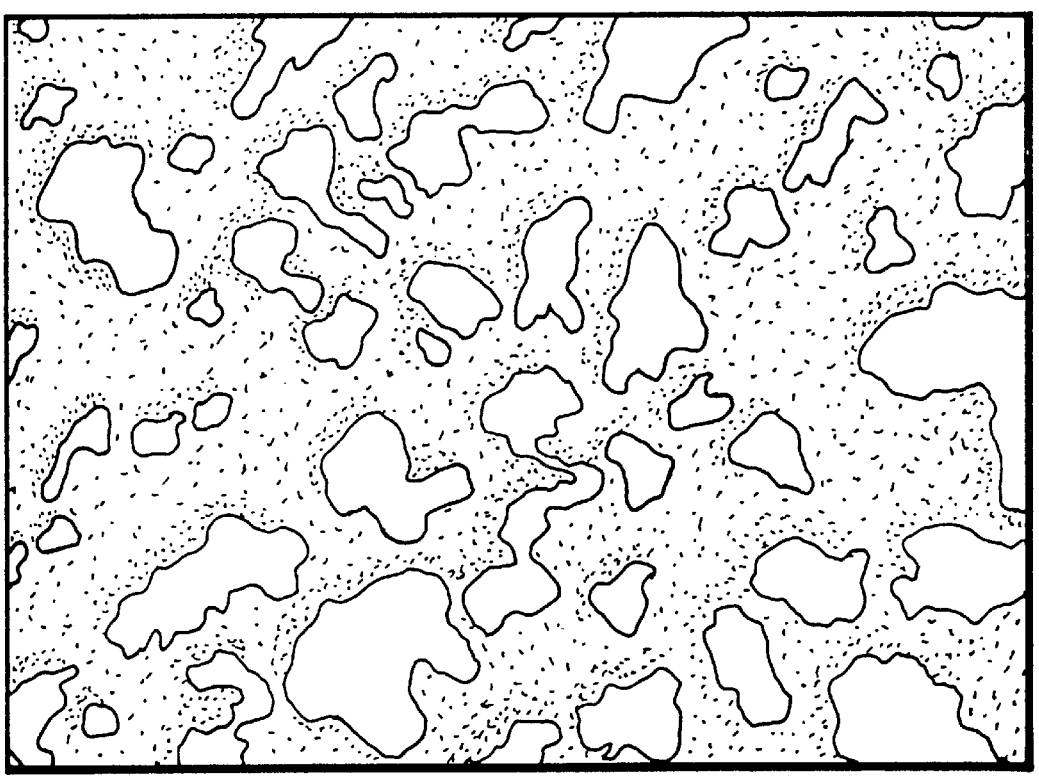
FIG. 2 is a schematic illustration of a greatly enlarged section showing a typical crystal structure in a product embodying the invention.

The cast shape is placed in a high temperature furnace in an inert neutral nonreactive atmosphere (e.g., argon) wherein it is heated to a desired recrystallizing temperature. Typically this temperature will be around 2350° C. or higher. In any event, the temperature is selected to cause sublimation of the fine silicon carbide powder resulting in recrystallization which results in a rigid, uniform shape of silicon carbide. The resulting structure is schematically illustrated in FIG. 2. FIG. 2 illustrates a uniformly porous and continuous single crystal structure.

The method of the present invention yields a product having a matrix of recrystallized silicon carbide having a porosity between about 15% and 40% and a flexural strength of at least about 11,000 psi.

If for some specific purpose a more restricted pore size is required, a coating can be applied to the fired shape by dipping, spraying, or brushing with a thin slurry of a ceramic powder. This would most commonly be silicon carbide, but it might be a ceramic powder from a group which includes alumina, mullite, zircon, or zirconia. After drying, this coating can be fired to a temperature determined to harden the ceramic, typically from about 1100° C. to about 1500° C. By use of this technique, filters have been produced with controlled pore sizes in the range of 2 $\mu$m. The addition of such a coating may also serve to protect the substrate and extend the life of the filter in certain operating environments.

The invention will be more clearly understood by reference to the following example.

EXAMPLE

Silicon carbide-based slips were prepared in accordance with the following formulations:

TABLE I

| Component | Trade Designation | Parts by Weight (Pounds) | |
|---|---|---|---|
| | | Slip A | Slip B |
| Silicon Carbide Coarse Grain | 60 grit | 32 | 8 |
| Silicon Carbide Coarse Grain | 46 grit | 127 | 31.8 |
| Silicon Carbide Powder | 3 $\mu$m | 141 | 35.3 |
| Sodium Silicate | — | 0.46 | 0.19 |
| De-ionized Water | — | 51 | 12.8 |
| HCl (10% solution) | — | 0.53 | 0.21 |

These components were gradually introduced to a ball mill over a twenty four hour period. The components were introduced sequentially to permit complete wetting of the grains without agglomeration.

At the completion of the mixing process, the viscosity, specific gravity and dispersion quality were determined to assure that the values obtained were sufficient to produce the desired porosity in the finished product.

Once the desired values were achieved, the resulting slip was poured into a slip-casting-type mold for producing a filter tube. The pouring was continued until the mold cavity was completely filled. Then the slip was left for a sufficient period of time to produce a desired wall thickness.

After a suitable period of time, the wall thickness was checked with calipers to verify that a desired wall thickness had been achieved. Then the excess slip was drained away and the green castings were left in place in the mold for a sufficient period of time to permit dewatering and release from the mold.

The green castings thus produced were removed from the molds and placed in a drying oven to complete the drying process.

Then the dried castings were removed from the drying oven and placed in a high temperature furnace where they were heated to a temperature of about 2370° C. An inert atmosphere was maintained in the furnace during the firing to prevent oxidation of the silicon carbide. At this temperature, the fine silicon carbide grains sublimated but the coarse grains did not. After cooling, the tubes were removed from the furnace.

The resulting gaseous phase silicon carbide condensed on the coarse grains resulting in recrystallization and thus the formation of a monolithic product. After cooling, the tubes were removed from the furnace.

The resulting tubes had a porosity of about 30%, an average pore diameter of about 80 µm and a flexural strength of about 12000 psi. These tubes were utilized in a hot gas filtration operation and found to provide good filtration with lasting durability.

The invention has been illustrated and described with respect to a specific embodiment thereof, which is intended for the purpose of illustration rather than limitation and other variations and modifications of the specific method and product herein shown and described will be apparent to those skilled in the art all within the intended spirit and scope of the invention. Accordingly, the invention is not to be limited in scope and effect to the specific embodiment herein shown and described, nor in any other way that is inconsistent with the extent to which the progress in the art has been advanced by the invention.

What is claimed is:

1. A permeable refractory product comprising a matrix of recrystallized silicon carbide having a porosity between 15% and 40% by volume, said matrix being formed by heating in an inert atmosphere a cast preform comprising a mixture of silicon carbide grains having a trimodal particle size distribution comprising from about 5% to about 20% by weight coarse particles having a grit size of from about 55 to about 65, from about 25% to about 50% by weight coarse particles having a grit size of from about 40 to about 50, and from about 25% to about 55% by weight fine particles having an average particle size of from about 0.5 to about 25 µm, said heating causing sublimation of said fine particles and a gaseous phase recrystallization to bond said coarse particles into a monolithic single crystal structure.

2. A permeable refractory product comprising a matrix of recrystallized silicon carbide as in claim 1 further comprising a coating of fine silicon carbide powder that upon firing modifies the pore size and permeability of said product.

3. A permeable refractory product comprising a matrix of recrystallized silicon carbide as in claim 1 further comprising a coating of another refractory material.

4. A permeable refractory product as set forth in claim 3 wherein said refractory material is a material selected from the group consisting of alumina, mullite, zircon, and zirconia.

5. A permeable refractory product as set forth in claim 1 wherein said product comprises a hot gas filter for use in filtering a high temperature stream of gas containing unwanted particulate matter.

6. A monolithic high temperature filter comprising a permeable refractory product, said product comprising a matrix of recrystallized silicon carbide having a porosity between 5% and about 40% by volume, said matrix being formed by heating in an inert atmosphere a cast preform comprising silicon carbide grains having a trimodal particle size distribution comprising from about 5% to about 20% by weight coarse particles having a grit size of from about 55 to about 65, from about 25% to about 50% by weight coarse particles having a grit size of from about 40 to about 50, and from about 25% to about 55% by weight fine particles having an average particle size of from about 0.5 to about 25 µm, said heating causing sublimation of said fine particles and a gaseous phase recrystallization to bond said coarse particles into a monolithic single crystal structure.

7. A filter as set forth in claim 6 having a flexural strength of at least about 11,000 psi.

* * * * *